US006879945B1

(12) United States Patent
Cook

(10) Patent No.: US 6,879,945 B1
(45) Date of Patent: Apr. 12, 2005

(54) SYSTEM AND METHOD FOR SIZING FOOTWEAR OVER A COMPUTER NETWORK

(75) Inventor: Christopher Simon Cook, Portland, OR (US)

(73) Assignee: Nike, Inc., Beaverton, OR (US)

(*) Notice: Subject to any disclaimer, the term of this patent is extended or adjusted under 35 U.S.C. 154(b) by 717 days.

(21) Appl. No.: 09/716,321

(22) Filed: Nov. 21, 2000

(51) Int. Cl.[7] .................................................. G06F 17/10
(52) U.S. Cl. ............................... 703/2; 36/8.4; 264/244
(58) Field of Search ............................ 700/118; 36/8.4; 264/244; 703/2

(56) References Cited

U.S. PATENT DOCUMENTS

| | | | | |
|---|---|---|---|---|
| 4,267,728 A | | 5/1981 | Manley et al. | |
| 4,598,376 A | | 7/1986 | Burton et al. | |
| 4,604,807 A | * | 8/1986 | Bock et al. ................... | 33/3 C |

(Continued)

FOREIGN PATENT DOCUMENTS

| | | |
|---|---|---|
| WO | WO 90/05345 | 5/1990 |
| WO | WO 94/20020 | 9/1994 |

OTHER PUBLICATIONS

Digitoe, Inc., *6 Steps to Ordering Shoe Lasts & Footwear from Digitoe*, 1998, 1 sheet.

Customatix.com, shoes designed by you, *u. s. women's measuring machine*, 2 sheets, (date unknown, but prior to filing of these application.

Customatix.com, shoes designed by you, *u. s. men's measuring machine*, 2 sheets, (date unknown, but prior to filing of these application.

The Oregarian Newspaper, Business, "Nike wil let buyers help design shoes," 4 pages, Thursday, Oct. 21, 1999.

Forbes—Magazine article, "A Nike without the swoosh? It may become commone as more shoppers demand personalized goods," p. 168, Oct. 16, 2000.

U.S. Appl. No. 09/721,445, "Method and System For Custom–manufacturing Items, Such As Footwear," filed Nov. 21, 2000.

Digitoe, Inc., "Custom Fit Footwear," www.digitoe.com, 1984–Present, 4 pages.

"NGAGE™ Digital Sizing System," Nike World Record, Feb./Mar. 1997. 2 pages.

Nikexpress Direct Sales over the Internet Expected to Reach 30% of Total Athletic Footwear Sales by Year 2003, The New York Times, Sep. 23, 1999, 1 page.

"The Florsheim Shoe Company—Express Shop," Harvard Business School, ©1988 by The President and Fellows of Harvard College, 14 pages.

*Primary Examiner*—Albert W. Paladini
(74) *Attorney, Agent, or Firm*—Banner & Witcoff, Ltd.

(57) ABSTRACT

A system and method for receiving footwear size and past product fit information for a user at a host computer from a client computer over a computer network, such as the Internet, is disclosed. Foot size information for the user (preferably measured in millimeters) is received from the client computer, and a recommended footwear size is determined for the selected footwear model based on the received foot size information, a length adjustment factor for the selected footwear model and past product fit information. Additionally, a width adjustment factor can be used for determining the recommended footwear size.

37 Claims, 10 Drawing Sheets

U.S. PATENT DOCUMENTS

| | | | | |
|---|---|---|---|---|
| 4,736,203 A | | 4/1988 | Sidlauskas | |
| 4,800,657 A | | 1/1989 | Brown | |
| 5,123,169 A | | 6/1992 | White et al. | |
| 5,128,880 A | | 7/1992 | White | |
| 5,164,793 A | | 11/1992 | Wolfersberger et al. | |
| 5,195,030 A | | 3/1993 | White | |
| 5,206,804 A | | 4/1993 | Theis et al. | |
| 5,216,594 A | | 6/1993 | White et al. | |
| 5,231,723 A | | 8/1993 | White et al. | |
| 5,237,520 A | | 8/1993 | White | |
| 5,339,252 A | | 8/1994 | White et al. | |
| 5,361,133 A | * | 11/1994 | Brown et al. | 356/612 |
| 5,515,268 A | | 5/1996 | Yoda | |
| 5,539,677 A | * | 7/1996 | Smith | 705/26 |
| 5,640,779 A | | 6/1997 | Rolloff et al. | |
| 5,659,395 A | | 8/1997 | Brown et al. | |
| 5,671,279 A | | 9/1997 | Elgamal | |
| 5,714,098 A | | 2/1998 | Potter | |
| 5,724,522 A | | 3/1998 | Kagami et al. | |
| 5,753,931 A | | 5/1998 | Borchers et al. | |
| 5,757,917 A | | 5/1998 | Rose et al. | |
| 5,783,810 A | | 7/1998 | Kelly, Jr. | |
| 5,790,256 A | | 8/1998 | Brown et al. | |
| 5,879,725 A | | 3/1999 | Potter | |
| 5,897,622 A | | 4/1999 | Blinn et al. | |
| 5,930,769 A | | 7/1999 | Rose | |
| 6,128,783 A | | 10/2000 | Blauer et al. | |
| 6,449,878 B1 | | 9/2002 | Lyden | |
| 6,463,351 B1 | | 10/2002 | Clynch | |
| 6,519,876 B1 | * | 2/2003 | Geer et al. | 36/76 R |
| 6,601,042 B1 | | 7/2003 | Lyden | |

* cited by examiner

SYSTEM AND METHOD FOR SIZING FOOTWEAR OVER A COMPUTER NETWORK

CROSS-REFERENCE TO RELATED APPLICATION

The present application is related to U.S. patent application Ser. No. 09/721,445 filed Nov. 21, 2000, entitled "Method and System For Custom-Manufacturing Items Such As Footwear," filed concurrent with the present invention and incorporated by reference herein.

BACKGROUND OF THE INVENTION

1. Field of the Invention

The present invention relates to footwear sizing techniques. More particularly, the present invention relates to a system and method for sizing footwear over a computer network.

2. Description of the Related Art

Footwear can be ordered over the Internet. See, for example, http://www.customatix.com and http://www.digitoe.com. While a user can select from a wide range of footwear products, a user, nevertheless, still has a fear that the footwear ordered would not fit correctly.

What is needed is a technique for recommending an appropriate shoe size to a user who selects footwear over a computer network.

SUMMARY OF THE INVENTION

The present invention provides a technique for recommending an appropriate shoe size to a user who selects footwear over a computer network, thereby alleviating the user's fears that the shoe size ordered will not be correct.

The advantages of the present invention are provided by a system and method for receiving footwear size information for a selected footwear model at a host computer from a client computer over a computer network, such as the Internet. According to the invention, foot size information for the selected footwear model (preferably measured in millimeters) is received from the client computer. Then, a recommended footwear size is determined for the selected footwear model based on the received foot size information and a length adjustment factor for the selected footwear model. Additionally, a width adjustment factor can be used for determining the recommended footwear size.

The length adjustment factor is determined by selecting, for at least one selected footwear size length, a representative footwear from a selected footwear production run for the selected footwear model, such that each representative footwear has a different selected footwear size length. An internal dimension is then measured for each representative footwear. A Brannock adjusted size length is determined for each respective selected footwear size length as the selected footwear size length minus the average Brannock footwear size length for a test subject group when the measured internal dimension for each respective representative footwear test shoe is within about ±2 mm of an average internal dimension for the selected footwear size length of the representative footwear for the selected footwear production run of the selected footwear model. The length adjustment factor for the selected production run for the selected footwear model is determined based on an average of each determined adjusted size length. The width adjust factor is determined in a similar manner.

The received foot size information is converted to a Brannock footwear size length, and a recommended footwear size for the selected footwear model is determined by adding the determined length adjustment factor to the converted Brannock footwear size length. According to the invention, the recommended footwear size for the selected footwear model can also be based on stored foot size information for a user relating to a selected footwear size for a past footwear product for the user. Information relating to the recommended footwear size for the selected footwear model is then sent to the client computer over the computer network. Subsequently, information relating to a selected footwear size for the selected footwear model is received from the client computer.

According to another aspect of the invention, the host computer receives a request for information relating to a foot measurement chart from the client computer, and sends the information relating to the foot measurement chart from the host computer to the client computer. Preferably, the information relating to the foot measurement chart provides foot size information in millimeters.

After the user receives the selected footwear, the user is queried for a fit assessment of the footwear. The information contained in the user's fit assessment includes information relating to at least the previous footwear model and size, a length fit assessment, a width fit assessment, toe room assessment, heel fit assessment, and an overall fit assessment. The fit assessment information is stored in a user profile and used for generating a future recommended shoe size for the user.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a system and method for sizing footwear over a computer network. In that regard, the present invention uses foot size measurements and past product fit assessments for recommending a shoe size for a shoe model selected by a user.

Figure 1:
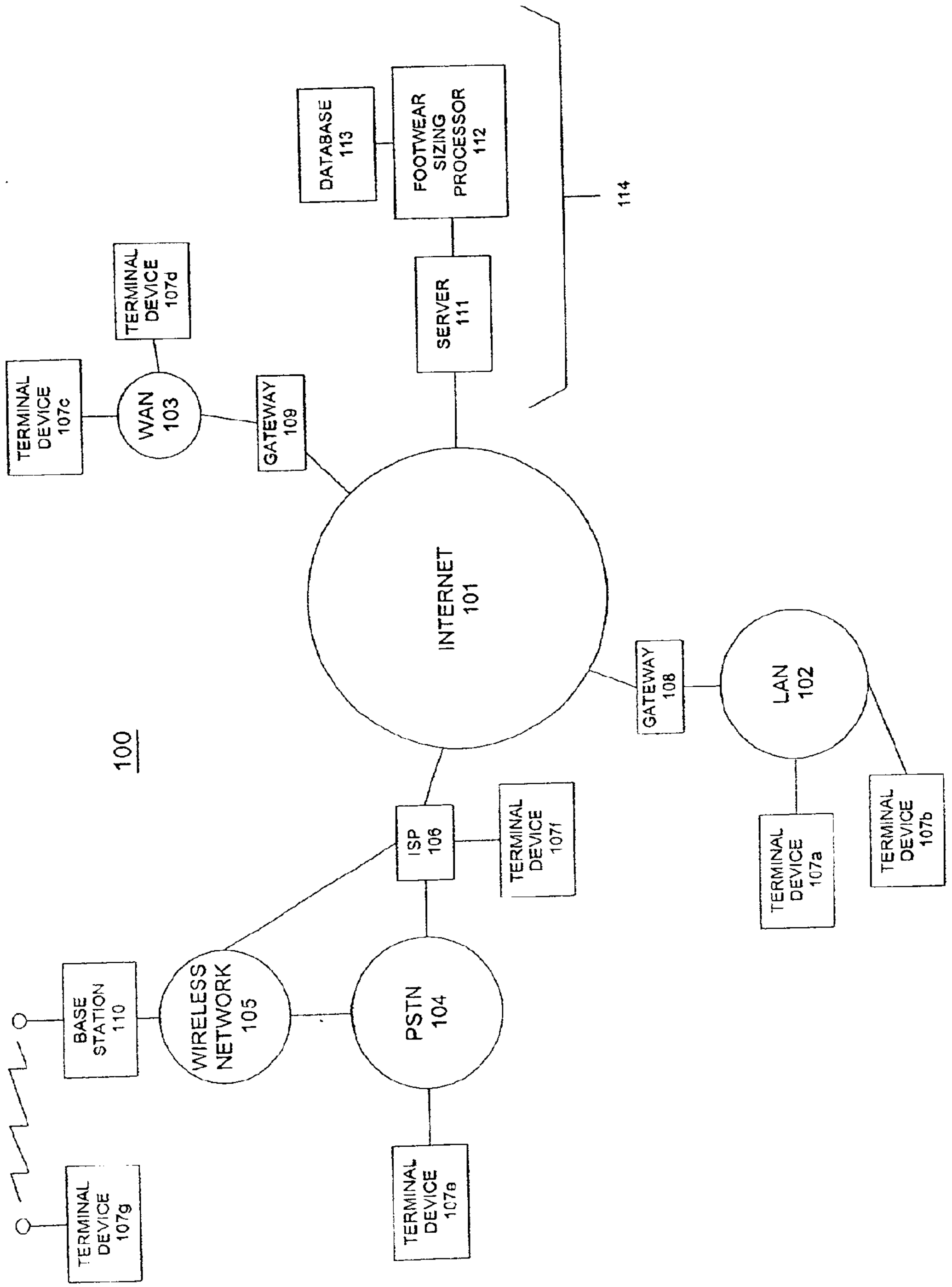
FIG. 1 shows a schematic block diagram of an exemplary communications system in which the computer network-based shoe sizing system of the present invention can be used.

FIG. 1 shows a schematic block diagram of a communications system 100 in which the computer network-based shoe sizing system of the present invention can be used. FIG. 1 shows an exemplary arrangement of networks, components and terminals that include a computer network 101, such as the Internet, a local area network (LAN) 102, a wide area network (WAN) 103, a public switched telephone network (PSTN) 104, a wireless network 105, an Internet Service Provider (ISP) 106 and a plurality of terminal devices 107a–107g. Each network 101–105 is interconnected with the other networks in a well-known manner. For example, LAN 102 and WAN 103 are each connected to the Internet 101 through a gateway 108 and 109, respectively, in a well-known manner. PSTN 104 and wireless network 105, such as a cellular telephone network or a personal communication system (PCS), are connected to the Internet 101 through ISP 106 in a well-known manner. Although not shown, PSTN 104 and wireless network 105 can, of course, be connected directly to the Internet 101.

A plurality of computer-based terminal devices 107a–107g, such as personal computers (PCS) and hand-held communication devices, are connected to the various exemplary computer networks in a well-known manner and operate as client computers. For example, terminal devices 107a and 107b are connected to the Internet 101 by a direct connection to LAN 102. Terminal devices 107c and 107d are connected to the Internet 101 by a direction connect to WAN 103. Terminal device 107e is connected to PSTN 104 by, for example, a modem, and establishes a connection to the Internet 101 through ISP 106 in a well-known manner. Terminal device 107f is directly connected to ISP 106 and, hence, to the Internet 101. Wireless terminal device 107g is connected to PSTN 104 through a base station (BS) 110 that is part of wireless network 105. While only terminal devices 107a–107g are shown in FIG. 1, it should be understood that many more terminal devices 107 can be connected to the various networks and components shown in FIG. 1. It should also be understood that terminal devices 107 can have a wide range of processing capabilities.

FIG. 1 also shows a server 111 that is connected to the Internet 101 in a well-known manner to host what is commonly known as a website. Thus, server 111 operates as a host computer. Of course, server 111 can host a single website, or can host a plurality of websites. A computer system 112 and a database 113 are coupled to server 111 in a well-known manner. Server 111 receives requests from the Internet 101 for information, such as a webpage, stored within computer system 112 and database 113. Server 111 receives the requests from a client computer, such as any of terminal devices 107, processes the requests in a well-known manner and passes the requests to computer system 112. Computer system 112, in turn, receives the requests from server 111, processes the requests and accesses database 113 for the specific information requested. Once the information stored in database 113 has been accessed, computer system 112 forwards the requested information through server 111 to the requesting client computer.

It should be understood that server 111, computer system 112 and database 113 can be combined into a single computer system performing the respective functions of server 111, computer system 112 and database 113. Consequently, functionality provided by server 111, computer system 112 and database 113 will be referred to herein as website 114 or host computer 114. It should also be understood that, while only one server 111 is shown connected to the Internet 101, there are a plurality of servers connected to the Internet 101 using a variety of well-known techniques. For example, a server can be connected directly to the Internet 101 or can be connected to the Internet 101, for example, by way of a LAN or a WAN.

Preferably, host computer 114 hosts information and webpages that allow a user at a client computer to select and purchase footwear. For example, a user at a client computer 107 can request images of specific shoe, sandal and/or boot models from which to choose, and ordering information, such as pricing and availability. Host computer 114 responds by sending the requested information to the requesting client computer. Preferably, host computer 114 provides an online footwear sizing system according to the present invention. As used herein, the terms footwear, shoe, sandal and boot are interchangeable.

Figure 2:
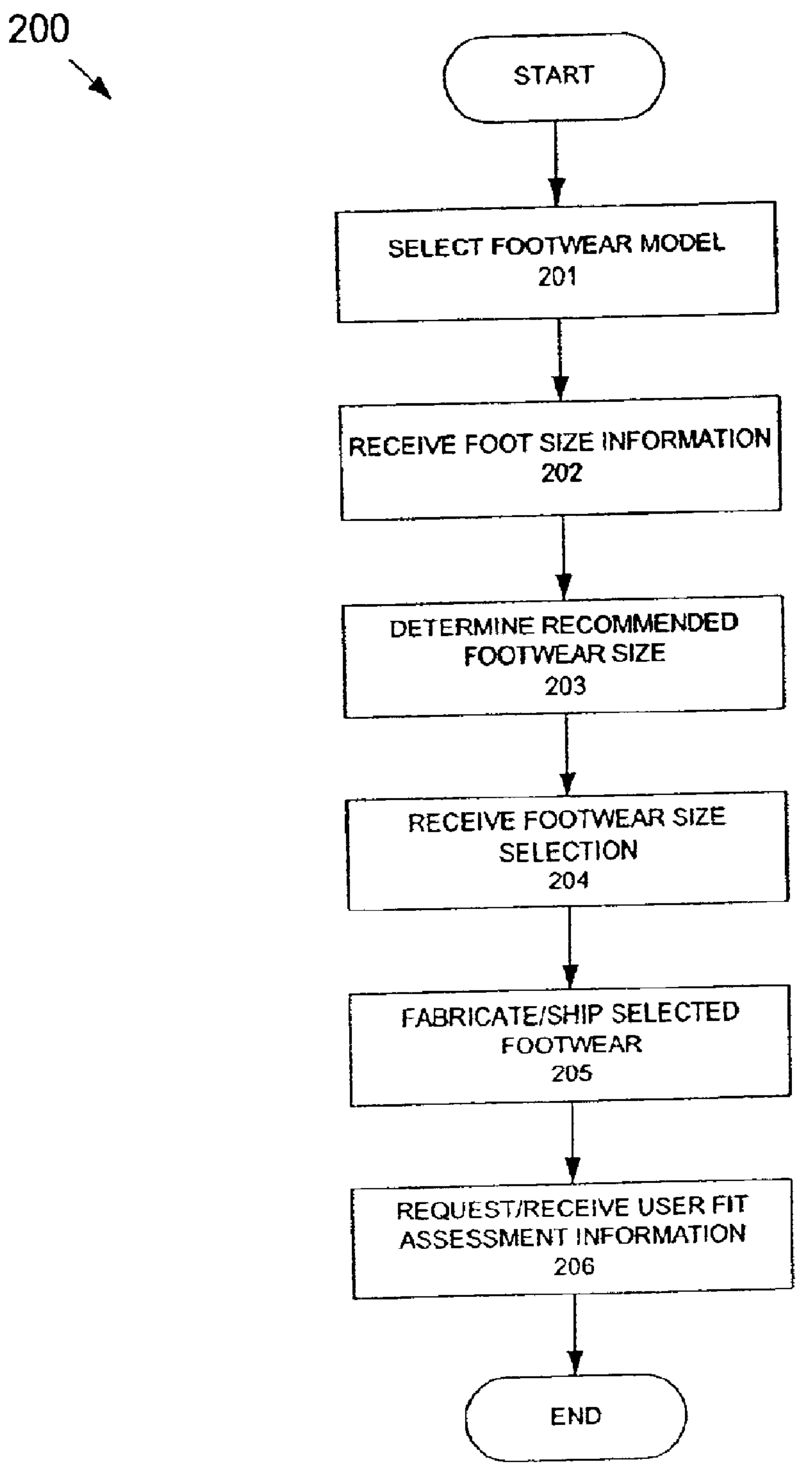
FIG. 2 shows a flow diagram of the overall process for online sizing of footwear according to the present invention.

FIG. 2 shows a flow diagram 200 of the overall process for online sizing of footwear according to the present invention. At step 201, a user at a client computer, such as terminal device 107a, selects a particular footwear model, such as an athletic shoe, a dress shoe, a casual shoe, a sandal or a boot. This can be done by any of a plurality of well-known techniques, such as by a user at a client computer "clicking" on an image of a desired footwear model that is visible on the display of the client computer, by the user clicking on the selected model name and/or number, or by the user entering a model name and/or number into a designated field that is visible on the display of the client computer. The selected shoe model can also be custom designed by the user. For example, the user can select color, logos, slogans, shoelace type and color, sole style and color, etc.

Figure 3A:
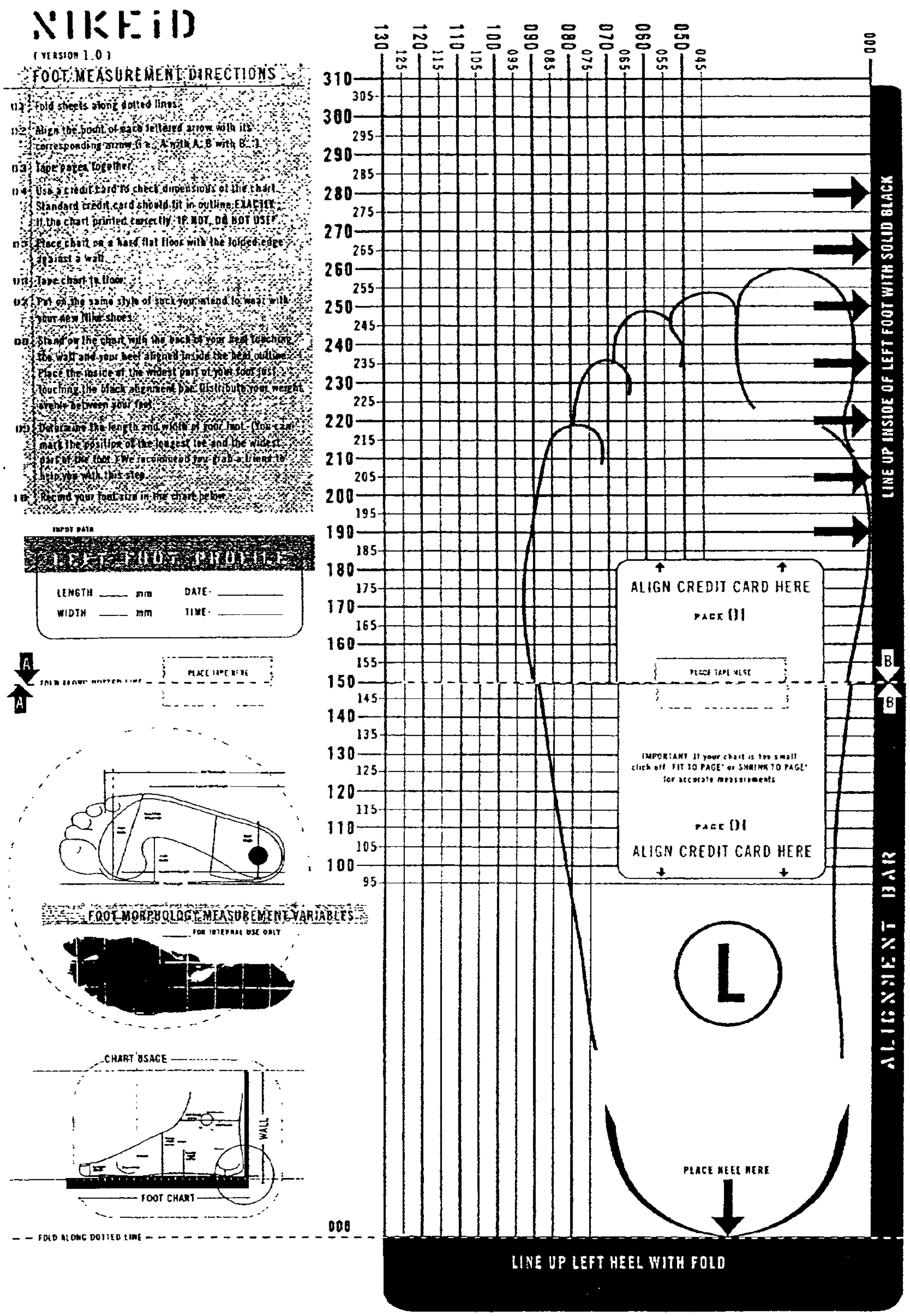
FIGS. 3A and 3B show an exemplary printable, foot sizing chart that is calibrated in millimeters and is downloadable from a host computer according to the present invention.
Figure 3B:
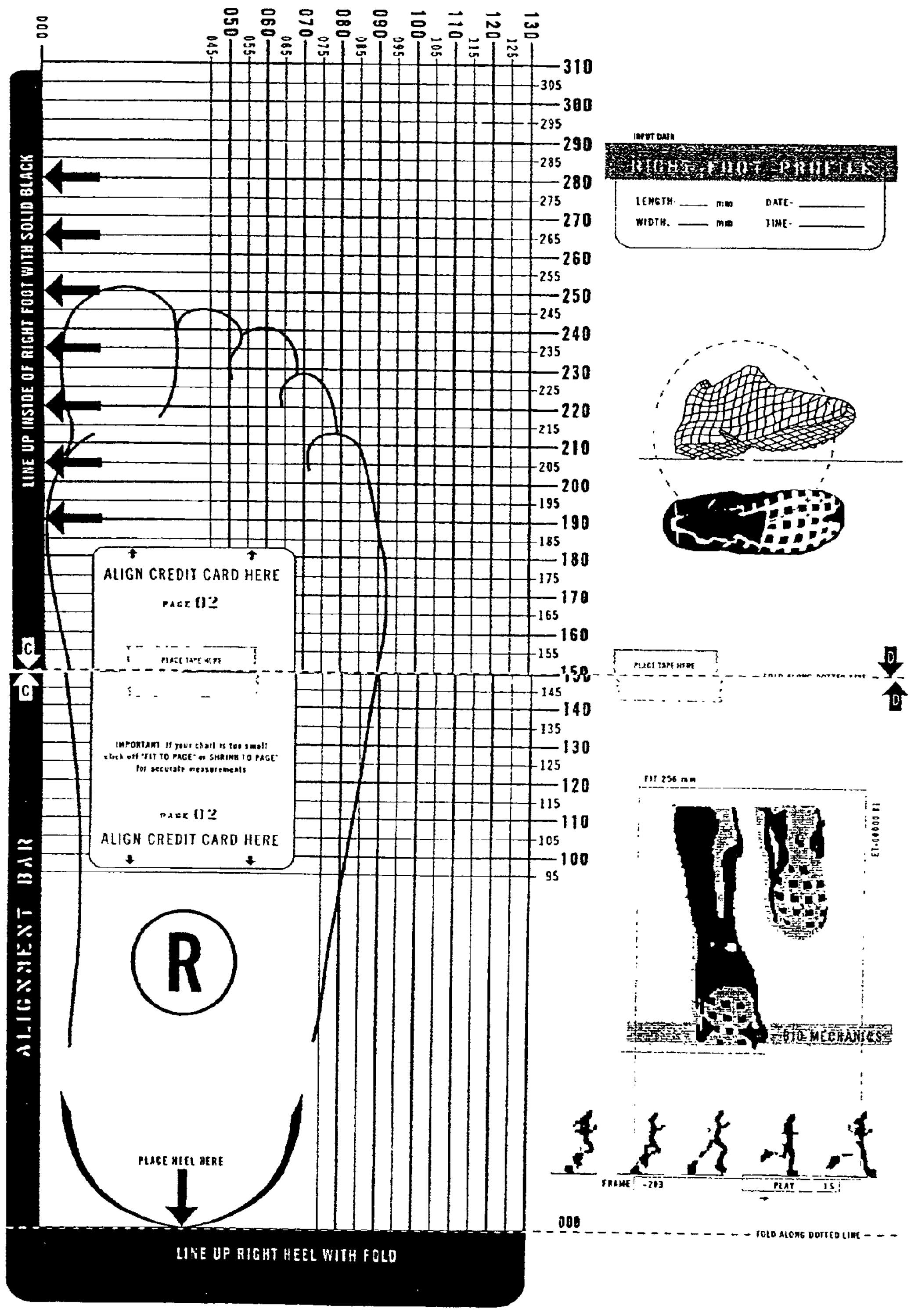

At step 202, the user sends foot-sizing information for the desired model of footwear to host computer 114. In order to obtain accurate foot size information (foot length and width in millimeters (mm)), the user can do one of several techniques. First, the user can use a foot size measuring device that can be mailed to the user upon request. Another technique that can be used is for the user to download a printable foot sizing chart from host computer 114 Preferably, the downloadable foot sizing chart is calibrated in millimeters so that a user, by standing on the chart in a prescribed manner, can accurately measure the length and width of both feet in millimeters. FIGS. 3A and 3B show an exemplary printable, foot sizing chart that is calibrated in millimeters and is downloadable from a host computer according to the present invention. Yet another technique is for the user to visit a specified retailing location and have the length and width of both feet, measured in millimeters, along with other foot measurement that include, but are not limited to, ball length (mm), ball girth (mm), instep girth (mm), heel width (mm), instep height (mm), and arch profile.

At step 203, the footwear sizing system of the present invention determines a recommend footwear size preferably based on fit and sizing assessment information for the latest production run of the selected shoe and fit assessment information provided by the user regarding a past footwear product previously selected and obtained through host computer 114 and/or selected and obtained from an associated retail outlet. The past product information can be submitted by the user at the time the new footwear is selected, or can have been submitted at an earlier time. The previously-provided fit assessment information is stored in a user profile for the user in, for example, database 113, and preferably includes the shoe model and shoe size, a length fit assessment, a width fit assessment, toe room assessment, heel fit assessment, and an overall fit assessment. Details regarding determination of a recommended footwear size are provided in connection with FIGS. 4–7. The recommended footwear size for the selected footwear model is sent from host computer 114 to client computer 107a.

At step 204, the user at client computer selects a desired footwear size for the selected footwear model. At step 205, the user selects method of payment in a well-known manner and the order for the selected footwear is placed. In the situation when the selected footwear model and size is in stock or is available for immediate shipment, a fulfillment center (not shown) associated with host computer 114 ships the selected footwear model to the user. In the situation when the selected footwear model is not in stock or available for immediate shipment, the selected footwear is fabricated, then shipped to the user.

At step 206, the user is queried a short while after the shoe is ordered for obtaining the user's fit assessment for the shoe. Preferably, an e-mail message is sent from host computer 114 to a client computer 107 about five weeks after the shoe is ordered requesting the user to again access the website hosted by host computer 114 and complete a fit assessment survey. The information contained in a completed user fit assessment survey is stored and used for generating a future recommended shoe size for the user.

Figure 4:
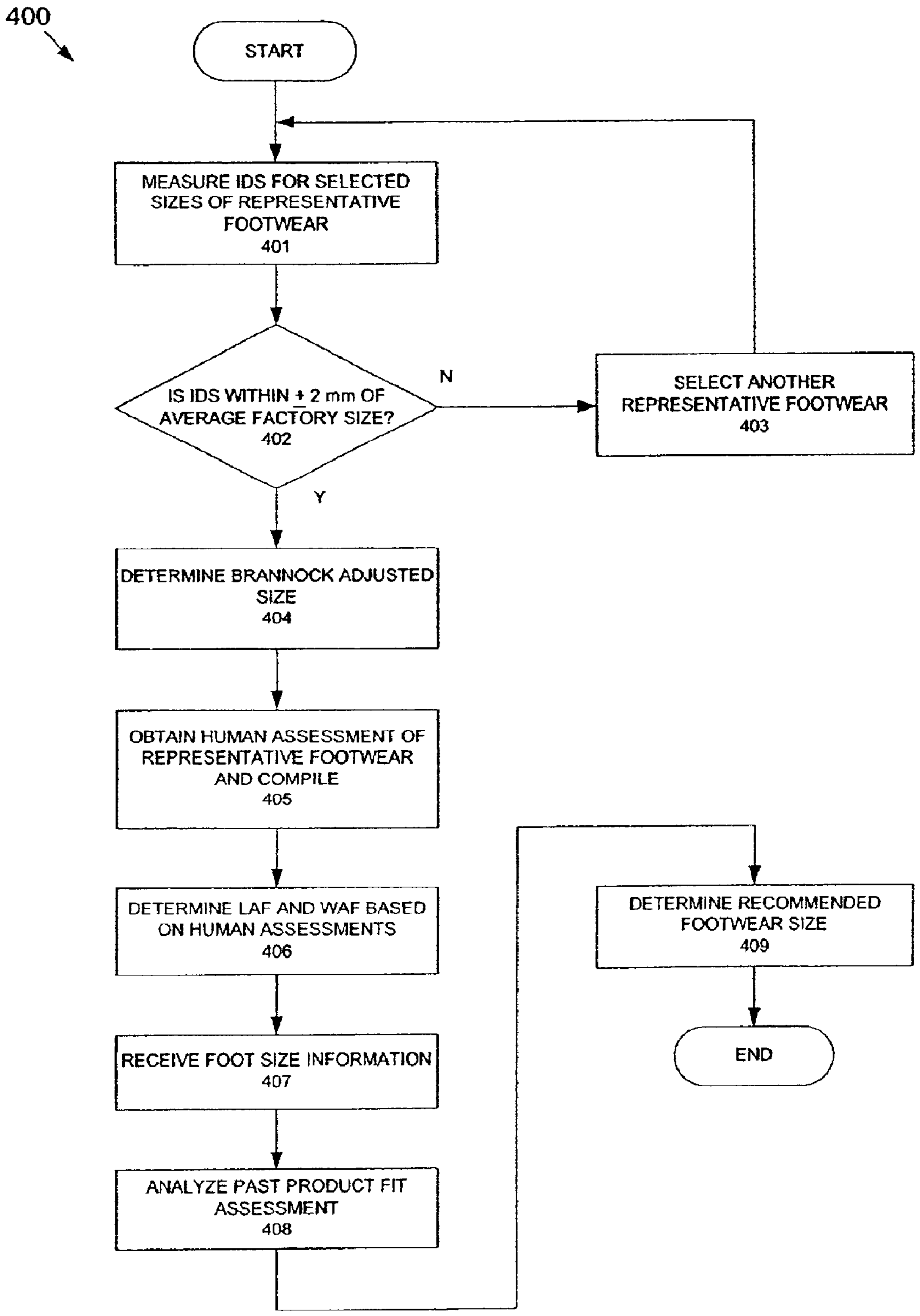
FIG. 4 shows a flow diagram of the overall process of generating a recommended footwear size for selected footwear according to the present invention.

FIG. 4 shows a flow diagram 400 of the overall process of generating a recommended footwear size for selected footwear according to the present invention. Steps 401–406 are performed asynchronously from steps 201–206 shown in FIG. 2. Because the size and fit of a footwear model varies slightly from production run to production run, the present invention utilizes size measurements and fit assessments made for the current production run for each respective footwear model that is available for purchase through website 114. The size measurements and fit assessments are then used as a basis for generating a foot size recommendation when foot size information is received from a user.

At step 401 in FIG. 4, the IDS (inside dimensions of the shoe) of each of a representative pair of shoes for each production run of the footwear model is measured for selected shoe sizes. For each production run of each men's shoe model, a representative pair of shoes is preferably selected for each of men's sizes 8, 10 and 12, and the IDS is measured for each representative shoe. For each production run of each women's shoe model, a representative pair of shoes is preferably selected for each of women's sizes 6, 8 and 10, and the IDS is measured for each representative shoe. For each production run of each youth's shoe model, a representative pair of shoes is preferably selected for youth's size 3.5.

At step 402, the IDS of each representative shoe is compared to the average factory size measurements for the shoe size for the shoe model. If the measured IDS of the representative shoe is not within ±2 mm of the average factory size measurements for the shoe size for the shoe model, then flow continues to step 403 where another representative shoe is selected in the same shoe size. Flow returns to step 401.

If, at step 402, the measured IDS of the representative shoe is within ±2 mm of the factory size measurements for the shoe size for the shoe model, then flow continues to step 404 where the representative shoe becomes a fit trial shoe that will be assessed for fit by a group of human subjects. The Brannock Adjusted Size (BA(Size)) for the shoe size for the shoe model is determined as:

$$BA(\text{Size})=(\text{Shoe Size})-(\text{Mean Brannock } (L+R)/2),$$

where, BA(Size) is the Brannock Adjusted Length for a test subject group, (Shoe Size) is the shoe size printed on the representative shoe, and (Mean Brannock (L+R)) is the average of the measured Brannock size of the left (L) and right (R) for the test subject group.

For example, if a pair of representative men's shoes are printed with a size 10, but the mean Brannock length of the left and right feet of the test subject group are 9.5 and 9.5, respectively, the BA(Size) would be 10–(9.5+9.5)/2=0.5. Similarly, if a pair of representative women's shoes are printed with a size 6, but the mean Brannock length of the left and right feet of the test subject group are 6.5 and 6.5, respectively, the BA(Size) would be 6–(6.5+6.5)/2=–0.5.

Also at step 404, the Brannock Adjusted Width (BAW) for each subject group is determined by first converting Brannock width measurements to a number scale, with width 4A converted to "1" and width 4E converted to "11". The Brannock Adjusted Width (BAW(Size)) for each representative shoe size for a men's shoe model having a Brannock width of D (i.e., "7") is the determined as:

$$BAW(\text{Width})=7-(\text{Mean Brannock Width } (L+R)/2),$$

where, BAW(Size) is the Brannock Adjusted Width for a test subject group, and (Mean Brannock Width (L+R)) is the average of the Brannock width of the left (L) and right (R) feet for the subject group in that representative size.

The Brannock Adjusted Width (BAW(Size)) for each representative shoe size for a women's shoe model having a Brannock width of B (i.e., "5") is the determined as:

$$BAW(\text{Width})=5-(\text{Mean Brannock Width } (L+R)/2),$$

where, BAW(Size) is the Brannock Adjusted Width for the test subject group, and (Mean Brannock Width (L+R)) is the average of the measured Brannock width of the left (L) and right (R) feet for the test subject group in the representative shoe size.

Flow continues to step 405 where human assessment information for each pair of representative shoes is collected. Preferably, human subjects having a measured shoe size corresponding to one of the selected shoe sizes (i.e., men's 8, 10 and 12, women's 6, 8 and 10, and youth's 3.5) try on the representative shoes and assessment several fit parameters. For example, men having size 12 feet try on and assess the representative men's' shoes in size 12. Similarly, women having size 8 feet try on and assess the representative women's shoes in size 8, and youths having size 3.5 feet try on and assess the representative youths shoes.

Each size category of human subjects then evaluate fit assessment parameters, such as toe box height (TBH), toe box width (TBW), ball girth (BG), waist instep (WI), heel (H), length (L), arch height (AH) and arch position (AP) for both the left and right representative shoes. The fit assessment parameters are preferably evaluated using a scale that ranges from 1 to 9, where 5 is a just right (JR) assessment; 1 is a too low, too narrow, too tight, too short, too far back, etc. assessment; and 9 is a too high, too wide, too loose, too long, too wide, too far forward etc. assessment. Moreover, assessments 1, 2, 8 and 9 are further categorized as a "Fix" type assessment, and assessments 4–6 are further categorized as "Just Right" assessments. The individual fit assessments for each shoe model are tallied for each fit assessment parameter and averaged.

Flow continues to step 406 where a length adjustment factor (LAF) and a width adjustment factor (WAF) for each shoe model is determined. Details regarding the determination of the LAF and the WAF are shown in FIGS. 5 and 6, respectively. At step 407, the foot sizing information, preferably in millimeters, is received from the user. Step 407 corresponds to step 202 of FIG. 2. Flow continues to step 408 where the foot size measurement submitted by the user is analyzed in view of any previously-provided fit assessment information for a past footwear product that is contained in a profile for the user. Details regarding the analysis of the submitted foot size measurement in view of any previously-provided fit assessment information for a past footwear product that is contained in a profile for the user is shown in FIG. 7.

Flow continues to step 409 where a recommended shoe size for the shoe selected by the user is determined by first determining the foot size of the user, then determining a recommended shoe size for the shoe model. For men's and youth's feet, foot size is determined as, $$\text{Foot Size}=(\text{length of longest foot } (mm))*0.118-22.2.$$

For women's feet, foot size is determined as, $$\text{Foot Size}=(\text{length of longest foot } (mm))*0.118-21.2.$$

The recommended shoe size is then calculated by adding the foot size of the user to the LAF for the shoe model selected by the user. In order for recommended shoe sizes to correspond to whole and half shoe sizes, the calculated recommended shoe size is rounded to generate the recommended shoe size. Preferably, when the calculated recommended shoe size for the selected shoe model includes a decimal value that is greater than or equal to 0.0 and less than or equal to 0.2, the calculated recommended shoe size is rounded down to be the integer value of the calculated recommended shoe size. When the calculated recommended shoe size for the selected shoe model includes a decimal value that is greater than 0.2 and less than or equal to 0.7, calculated recommended shoe size is rounded to be the integer value of the recommended shoe size plus 0.5. When the calculated recommended shoe size for the selected shoe model includes a value that is greater than 0.7 and less than 0.0, calculated recommended shoe size is rounded up to the next integer value.

Flow continues to step 410, where the recommended shoe size for the selected shoe model is sent to the client computer. Steps 409 and 410 correspond to step 203 of FIG. 2.

Figure 5A:
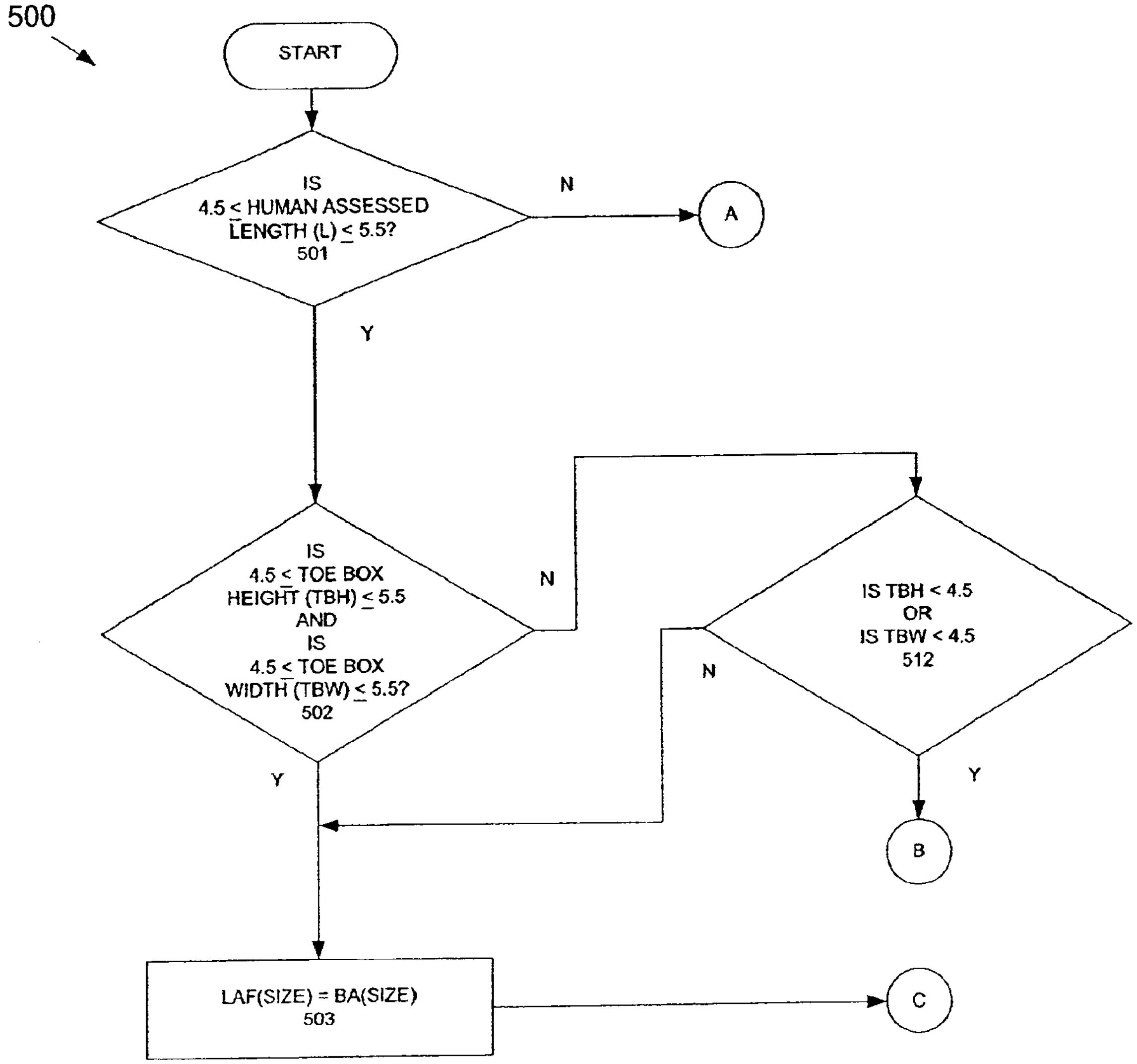
FIGS. 5A and 5B show a flow diagram for a process for generating a length adjustment factor (LAF) for a particular footwear model according to the present invention.
Figure 5B:
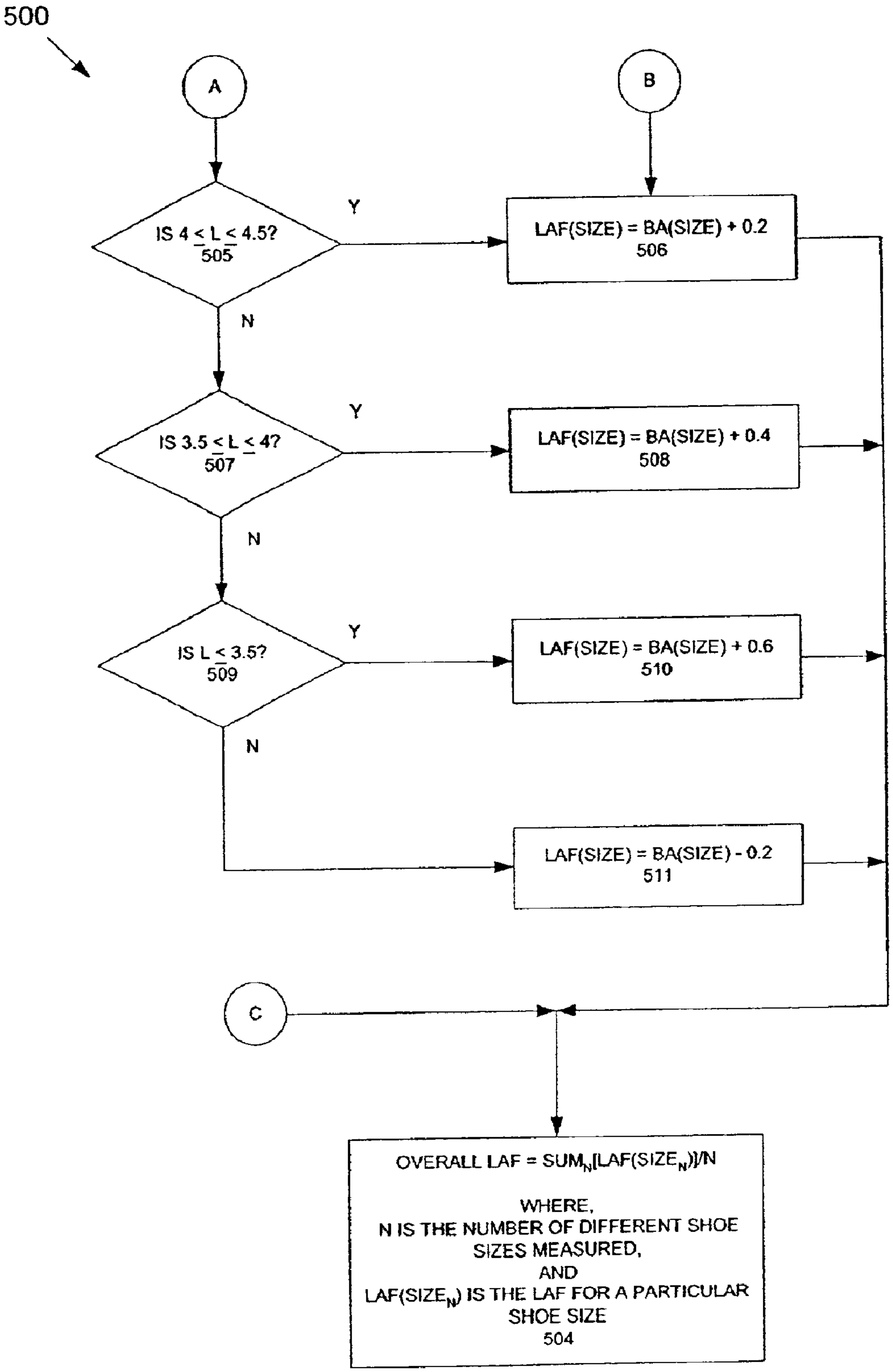

FIGS. 5A and 5B show a flow diagram 500 for a process for generating a length adjustment factor (LAF) for a particular footwear model according to the present invention. At step 501, it is determined whether the averaged length fit assessment for each shoe size L(Size) of a representative shoe is greater than or equal to 4.5 and less than or equal to 5.5. If not, flow continues to step 505. If 4.5≦L(Size)≦5.5, then flow continues to step 502, where it is determined whether 4.5<assessed toe box height (TBH) (Size)<5.5 and whether 4.5<assessed toe box width (TBW) (Size)<5.5. If not, flow continues to step 512. If so, flow continues to step 503 where the LAF for the shoe size is determined to be LAF(Size)=BA(Size). Flow continues to step 504.

If, at step 501, flow continued to step 505, it is determined whether 4≦L(Size)<4.5. If not, flow continues to step 507. If so, flow continues to step 506, where the LAF for the shoe size is determined to be LAF(Size)=BA(Size)+0.2. Flow continues to step 504.

If, at step 505, flow continued to step 507, it is determined whether 3.5≦L(Size)<4. If not, flow continues to step 509. If so, flow continues to step 508, where the LAF for the shoe size is determined to be LAF(Size)=BA(Size)+0.4. Flow continues to step 504.

If, at step 507, flow continued to step 509, it is determined whether L(Size)<3.5. If not, flow continues to step 511. If so, flow continues to step 510, where the LAF for the shoe size is determined to be LAF(Size)=BA(Size)+0.6. Flow continues to step 504.

If, at step 509, flow continued to step 511, L(Size)>5.5 by default and the LAF for the shoe size is determined to be LAF(Size)=BA(Size)−0.2. Flow continues to step 504.

If, at step 502, flow continued to step 512, it is determined whether TBW<4.5 or whether TBH<4.5. If not, flow continues to step 503 where the LAF for the shoe size is determined to be LAF(Size)=BA(Size). If so, flow continues to step 506 where the LAF for the shoe size is determined to be LAF(Size)=BA(Size)+0.2.

Once an LAF(Size) for all shoes sizes assessed by human subjects for a shoe model has been determined, flow continues to step 504 where the determined LAFs for a shoe model are averaged to generate an overall LAF for the shoe model.

Figure 6A:
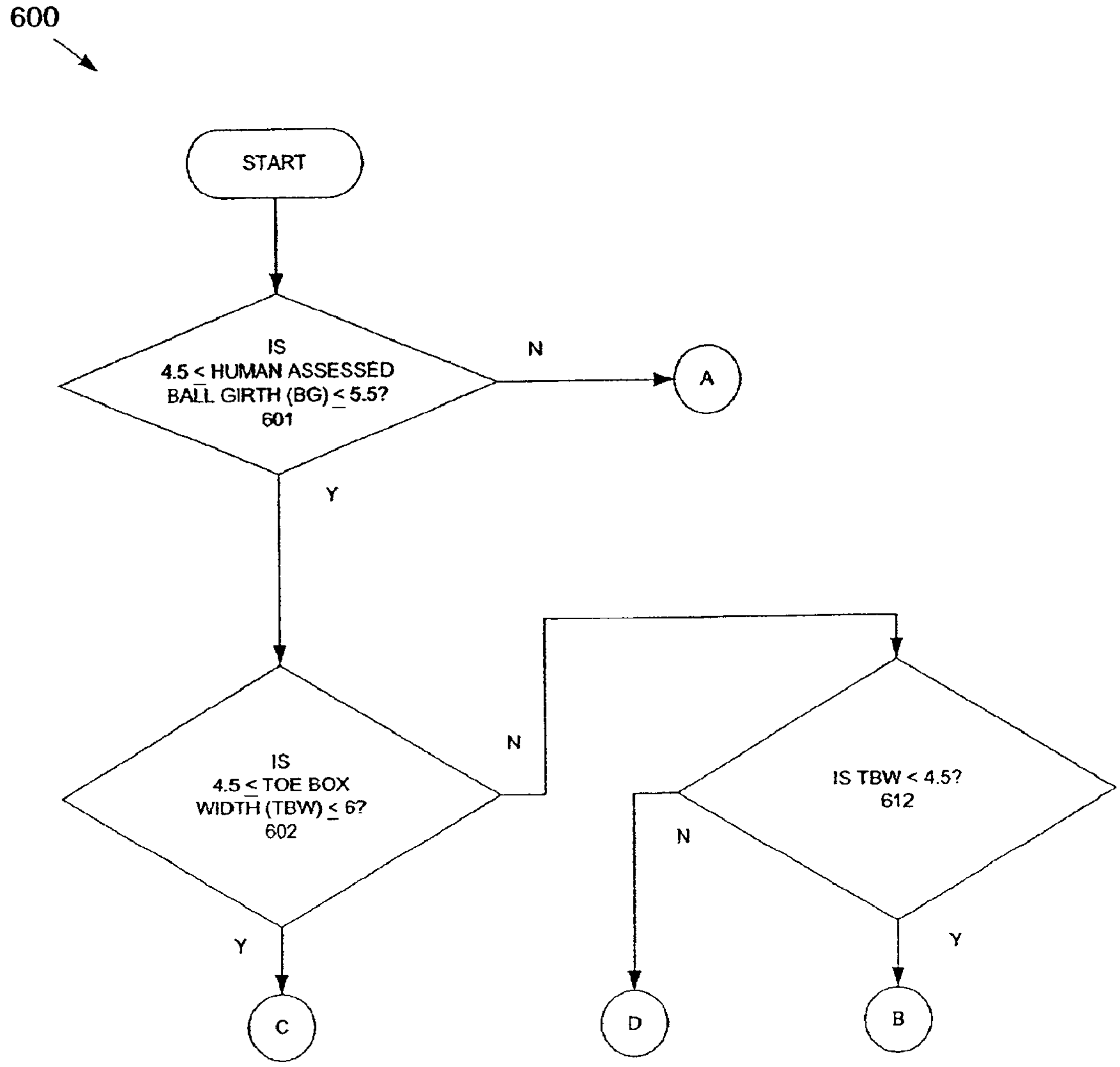
FIGS. 6A and 6B show a flow diagram for a process for generating a width adjustment factor (WAF) for a particular footwear model according to the present invention.
Figure 6B:
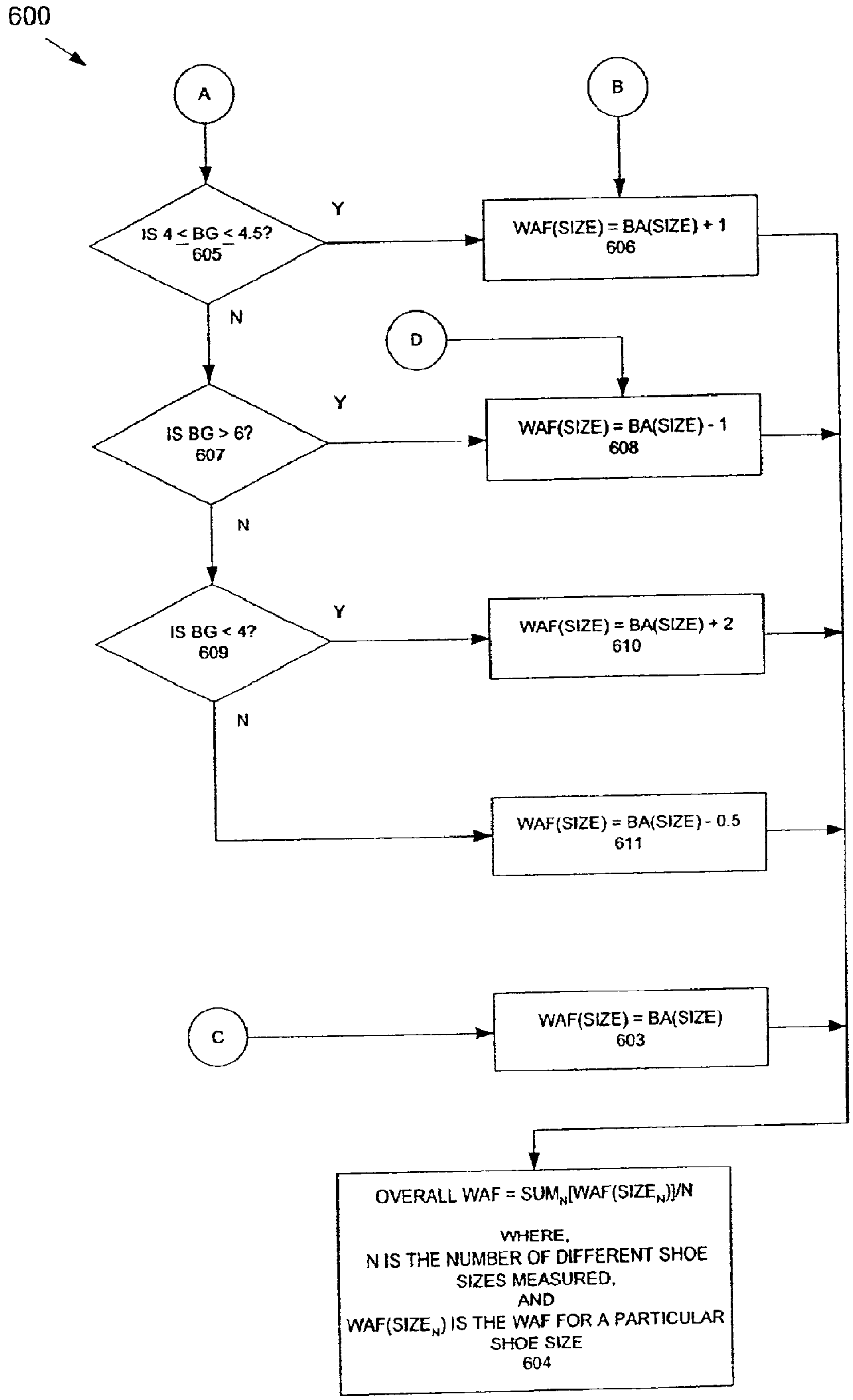
Figure 7:
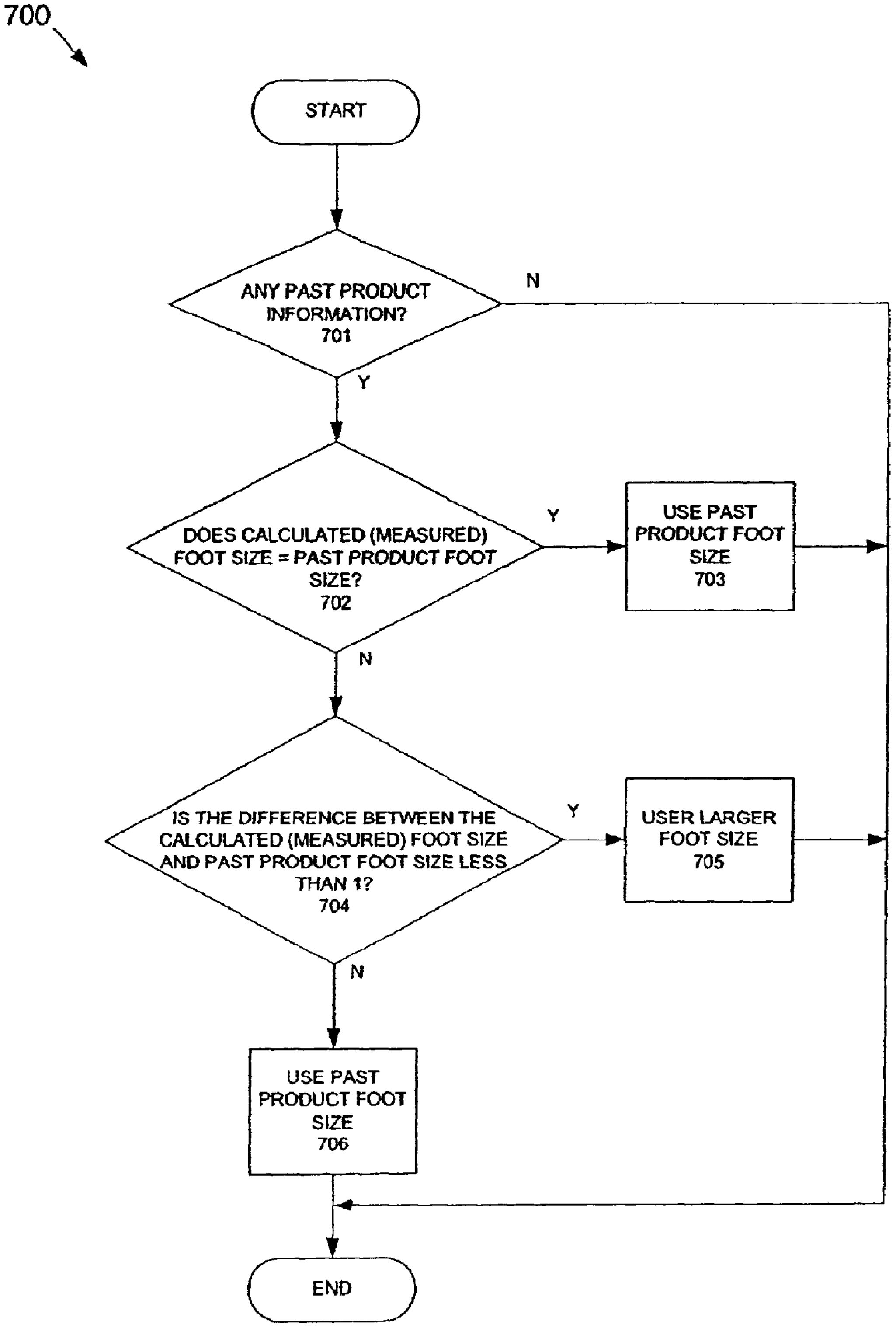
FIG. 7 shows a flow diagram for analyzing a submitted foot size measurement in view of any previously-provided fit assessment information for a past footwear product that is contained in a profile for the user according to the present invention.

FIGS. 6A and 6B show a flow diagram 600 for a process for generating a width adjustment factor (WAF) for a particular footwear model according to the present invention. At step 601, it is determined whether the averaged ball girth fit assessment for each shoe size BG(Size) of a representative shoe is greater than or equal to 4.5 and less than or equal to 5.5. If not, flow continues to step 605. If 4.5≦BG(Size)≦5.5, then flow continues to step 602, where it is determined whether 4.5<assessed TBW(Size)<55. If not, flow continues to step 612. If so, flow continues to step 603 where the WAF for the shoe size is determined to be WAF(Size)=BAW(Size). Flow continues to step 604.

If, at step 601, flow continued to step 605, it is determined whether 4≦BG(Size)<4.5. If not, flow continues to step 607. If so, flow continues to step 606, where the WAF for the shoe size is determined to be WAF(Size)=BAW(Size)+1. Flow continues to step 604.

If, at step 605, flow continued to step 607, it is determined whether BG(Size)>6. If not, flow continues to step 609. If so, flow continues to step 608, where the WAF for the shoe size is determined to be WAF(Size)=BAW(Size)−1. Flow continues to step 604.

If, at step 607, flow continued to step 609, it is determined whether BG(Size)<4. If not, flow continues to step 611. If so, flow continues to step 610, where the WAF for the shoe size is determined to be WAF(Size)=BAW(Size)+2. Flow continues to step 604.

If, at step 609, flow continued to step 611, 5.5<BG(Size) ≦6 by default and the WAF for the shoe size is determined to be WAF(Size)=BAW(Size)−0.5. Flow continues to step 604.

If, at step 602, flow continued to step 612, it is determined whether TBW<4.5. If not, flow continues to step 608. If so, flow continues to step 606 where the WAF for the shoe size is determined to be WAF(Size)=BAW(Size)+1. Flow continues to step 604.

If, at step 612, flow continued to step 608, where the WAF for the shoe size is determined to be WAF(Size)=BAW(Size)−1. Flow continues to step 604.

Once a WAF(Size) for all shoes sizes assessed by human subjects for a shoe model has been determined, flow continues to step 604 where the determined WAFs for a shoe model are averaged to generate an overall WAF for the shoe model.

FIG. 7 shows a flow diagram 700 for analyzing a calculated (i.e., measured, see step 406 of FIG. 4) foot size measurement in view of any previously-provided fit assessment information for a past footwear product that is contained in a profile for the user according to the present invention. The process of FIG. 7 corresponds to step 408 in FIG. 4. At step 701, it is determined whether there is any previously-provided fit assessment information for a past footwear product that is contained in a profile for the user. If not, the analysis is ended. If so, flow continues to step 702 where it is determined whether the calculated (measured) foot size information equals the previously-provided fit assessment foot size information for a past footwear product.

If, at step 702, it is determined that the calculated (measured) foot size information equals the previously-provided fit assessment foot size information, flow continues to step 703 where the previously-provided fit assessment foot size is used. If, at step 702, the calculated (measured) foot size information does not equal the previously-provided fit assessment information, flow continues to step 704.

At step 704, it is determined whether the difference between the submitted foot size information and the previously-provided fit assessment foot size information is less than 1. If not, flow continues to step 705 where the larger foot size information is used. If so, flow continues to step 706 where the foot size information for the past footwear product is used.

While the present invention has been described as generating a recommended footwear size in Brannock-based sizes, other footwear sizing standards, such as European footwear sizes (French Paris point), Japanese (cm scale), Mondo point, UK, cm, can be readily incorporated into the present invention.

The recommended sizing technique of the present invention can also be used for customized footwear sizing, such as selecting the thickness and/or weight of cushioning, footwear uppers features, etc., basing the recommended size on measurements made for the current production run of the selected footwear features (which take into account the manufacturing tolerances for the current production run) and any past product information stored in a profile for the user.

Moreover, the recommended sizing technique of the present invention can be used for generating a recommended size for apparel. Accordingly, a user at a client computer selects a particular garment and supplies size measurements. The host computer then generates a recommended size based on measurements made for the current production run of the selected garment and any past product information stored in a profile for the user. Thus, a host computer can generate a recommended size for pants, shirts, socks, sweaters, coats, belts, etc.

While the present invention has been described in connection with the illustrated embodiments, it will be appreciated and understood that modifications may be made without departing from the true spirit and scope of the invention.

What is claimed is:

1. A method of determining a footwear size, the method comprising steps of:

receiving foot size information for the selected footwear model from the client computer; and determining a recommended footwear size for the selected footwear model based on the received foot size information and a length adjustment factor for the selected footwear model.

2. The method according to claim 1, wherein the length adjustment factor is determined by:

selecting, for at least one selected footwear size length, a representative footwear from a selected footwear production run for the selected footwear model, each representative footwear having a different selected footwear size length;

measuring an intern dimension for each representative footwear;

determining a Brannock adjusted size length for a test subject group as the selected footwear size length minus the average Brannock footwear size length for the test subject group when the measured internal dimension for each respective representative footwear is within about ±2 mm of an average internal dimension for the selected footwear size length of the representative footwear for the selected footwear production run of the selected footwear model; and determining the length adjustment factor for the selected production run for the selected footwear model based on each determined Brannock adjusted size length.

3. The method according to claim 2, wherein the step of determining the length adjustment factor for the selected production run for the selected footwear model further includes steps of:

determining a human assessment for a length fit parameter for each respective representative footwear when the measured internal dimension of the representative footwear is within about ±2 mm of an average internal dimension for the selected footwear size length of the representative footwear for the selected footwear production run of the selected footwear model;

determining the length adjustment factor for a selected footwear size length as the Brannock adjusted size length when the human assessment for the length fit parameter for the representative footwear for the selected footwear size length is assessed as being acceptable;

determining the length adjustment factor for a selected footwear size length as the Brannock adjusted size length plus a first predetermined amount when the human assessment for the length fit parameter for the representative footwear for the selected footwear size length is assessed as being too short; and determining the length adjustment factor for a selected footwear size length as the Brannock adjusted size length minus a second predetermined amount when the human assessment for the length fit parameter for the representative footwear for the selected footwear size length is assessed as being too long.

4. The method according to claim 3, wherein the step of determining the length adjustment factor when the human assessment for the length fit parameter for the representative footwear is assessed as being acceptable further includes steps of:

determining a human assessment for a toe box height fit parameter and a toe box width fit parameter for each respective representative footwear;

determining the length adjustment factor for a selected footwear size length as the Brannock adjusted size length when the human assessment for the toe box height fit parameter and the toe box width fit parameter for the representative footwear for the selected footwear size length is assessed as being acceptable; and determining the length adjustment factor for a selected footwear size length as the Brannock adjusted size length plus a third predetermined amount when at least one of the toe box height fit parameter for the selected footwear size length is assessed as being too low and the toe box width fit parameter for the selected footwear size length is assessed as being too narrow.

5. The method according to claim 2, wherein the step of determining the length adjustment factor for the selected production run for the selected footwear mode is further based on an average of each determined adjusted size length.

6. The method according to claim 5, further comprising steps of:

converting the received foot size information to a Brannock footwear size length; and determining a recommended footwear size for the selected footwear model by adding the determined length adjustment factor to the converted Brannock footwear size length.

7. The method according to claim 6, wherein the step of determining the recommended footwear size for the selected footwear model is further based on stored foot size information for a user of the host computer, the stored selected footwear size information relating to a footwear size and fit characteristics of a past footwear product for the user.

8. The method according to claim 7, wherein the stored selected footwear size information includes user assessment information for at least one footwear fit parameter.

9. The method according to claim 6, wherein the foot size information is in millimeters.

10. The method according to claim 9, wherein when the selected footwear model is one of a men's and a youth's footwear model, the step of converting the received foot size information to the Brannock footwear size length converts the received foot size information as:

$$\text{Brannock footwear size length}=(\text{received foot size information } (mm)\times 0.118)-22.2, \text{ and}$$

wherein when the selected footwear model is a women's footwear model, the step of converting the received foot size information to the Brannock footwear size length converts the received foot size information as:

$$\text{Brannock footwear size length}=(\text{received foot size information } (mm)\times 0.118)-21.2.$$

11. The method according to claim 10, wherein when the recommended footwear size for the selected footwear model includes a decimal value that is greater than or equal to 0.0 and less than or equal to 0.2, the method further comprising a step of rounding the recommended footwear size down to the integer value of the recommended footwear size, wherein when the recommended footwear size for the selected footwear model includes a decimal value that is greater than 0.2 and less than or equal to 0.7, the method further comprising a step of rounding the recommended footwear size to the integer value of the recommended footwear size plus 0.5, and wherein when the recommended footwear size for the selected footwear model includes a value that is greater than 0.7 and less than 0.0, the method further comprising a step of rounding the recommended footwear size is rounded up to the next integer value.

12. The method according to claim 7, further comprising a step of sending information relating to the recommended footwear size for the selected footwear model to the client computer over the computer network.

13. The method according to claim 12, further comprising a step of receiving information relating to a selected footwear size for the selected footwear model from the client computer.

14. The method according to claim 13, further comprising a step of fabricating a footwear based on the received selected footwear size.

15. The method according to claim 1, wherein the step of determining a recommended footwear size for the selected footwear model is further based on a width adjustment factor for the selected footwear model.

16. The method according to claim 15, wherein the width adjustment factor is determined by:

selecting, for at least one selected footwear size length, a representative footwear from a selected footwear production run for the selected footwear model, each representative footwear having a different selected footwear size length;

measuring an internal dimension for each representative footwear;

determining a Brannock adjusted size width for each test subject group as the predetermined footwear size width minus the average Brannock footwear size width for the selected footwear size length for the test subject group when the measured internal dimension for each respective representative footwear is within about ±2 mm of an average internal dimension for the selected footwear size length of the representative footwear for the selected footwear production run of the selected footwear model; and determining the width adjustment factor for the selected production run for the selected footwear model based on each determined Brannock adjusted size width.

17. The method according to claim 16, wherein the step of determining the width adjustment factor for the selected production run for the selected footwear model further includes steps of:

determining a human assessment for a ball girth fit parameter for each respective representative footwear when the measured internal dimension of the representative footwear is within about ±2 mm of an average internal dimension for the selected footwear size length of the representative footwear size for the selected footwear production run of the selected footwear model;

determining the width adjustment factor for a selected footwear size as the Brannock adjusted size when the human assessment for the length fit parameter for the representative footwear width for the selected footwear size is assessed as being acceptable;

determining the width adjustment factor for a selected footwear size length as the Brannock adjusted size width plus a fourth predetermined amount when the human assessment for the ball girth fit parameter for the representative footwear for the selected footwear size length is assessed as being too narrow, and determining the width adjustment factor for a selected footwear size length as the Brannock adjusted size width minus a fifth predetermined amount when the human assessment for the ball girth fit parameter for the representative footwear for the selected footwear size length is assessed as being too wide.

18. The method according to claim 17, wherein the step of determining the width adjustment factor when the human assessment for the ball girth fit parameter for the representative footwear is assessed as being acceptable further includes steps of:

determining a human assessment for a toe box width fit parameter for each respective representative footwear;

determining the width adjustment factor for a selected footwear size length as the Brannock adjusted size width when the human assessment for the toe box width fit parameter for the representative footwear for the selected footwear size length is assessed as being acceptable; and determining the width adjustment factor for a selected footwear size as the Brannock adjusted size plus a sixth predetermined amount when the toe box width fit parameter for the selected footwear size length is assessed as being narrow.

19. The method according to claim 1, wherein the computer network is the Internet.

20. A system for generating a recommended footwear size, the system comprising:

a host computer connected to a computer network, the host computer receiving foot size information for a selected footwear model from a client computer over the computer network; and a footwear sizing processor determining a recommended footwear size for the selected footwear model based on the received foot size information and a length adjustment factor for the selected footwear model.

21. The system according to claim 20, wherein the footwear sizing processor determines the length adjustment factor by selecting, for at least one selected footwear size length, a representative footwear from a selected footwear production run for the selected footwear model, each representative footwear having a different selected footwear size length, measuring an internal dimension for each representative footwear, determining a Brannock adjusted size length for each respective selected footwear size length test subject group as the selected footwear size length minus the average Brannock footwear size length for the selected footwear size length test subject group when the measured internal dimension for each respective representative footwear is within about ±2 mm of an average internal dimension for the selected footwear size length of the representative footwear for the selected footwear production run of the selected footwear model, and determining the length adjustment factor for the selected production run for the selected footwear model based on each determined Brannock adjusted size length.

22. The system according to claim 21, wherein the footwear sizing processor determines the length adjustment factor by determining a human assessment for a length fit parameter for each respective representative footwear when the measured internal dimension of the representative footwear is within about ±2 mm of an average internal dimension for the selected footwear size length of the representative footwear for the selected footwear production run of the selected footwear model, determining the length adjustment factor for a selected footwear size length as the Brannock adjusted size length when the human assessment for the length fit parameter for the representative footwear for the selected footwear size length is assessed as being acceptable, determining the length adjustment factor for a selected footwear size length as the Brannock adjusted size length plus a first predetermined amount when the human assessment for the length fit parameter for the representative footwear for the selected footwear size length is assessed as being too short, and determining the length adjustment factor for a selected footwear size length as the Brannock adjusted size length minus a second predetermined amount when the human assessment for the length fit parameter for the representative footwear for the selected footwear size length is assessed as being too long.

23. The system according to claim 22, wherein the footwear sizing processor determines the length adjustment factor when the human assessment for the length fit parameter for the representative footwear is assessed as being acceptable further by determining a human assessment for a toe box height fit parameter and a toe box width fit parameter for each respective representative footwear, determining the length adjustment factor for a selected footwear size length as the Brannock adjusted size length when the human assessment for the toe box height fit parameter and the toe box width fit parameter for the representative footwear for the selected footwear size length is assessed as being acceptable, and determining the length adjustment factor for a selected footwear size length as the Brannock adjusted size length plus a third predetermined amount when at least one of the toe box height fit parameter for the selected footwear size length is assessed as being too low and the toe box width fit parameter for the selected footwear size length is assessed as being too narrow.

24. The system according to claim 21, wherein the footwear sizing processor determines the length adjustment factor for the selected production run for the selected footwear mode further based on an average of each determined adjusted size length.

25. The system according to claim 24, wherein the footwear sizing processor converts the received foot size information to a Brannock footwear size length, and determines a recommended footwear size for the selected footwear model by adding the determined length adjustment factor to the converted Brannock footwear size length.

26. The system according to claim 25, wherein the footwear sizing processor determines the recommended footwear size for the selected footwear model further based on stored foot size information for a user of the host computer, the stored selected footwear size information relating to a footwear size and fit characteristics of a past footwear product for the user.

27. The system according to claim 26, wherein the stored selected footwear size information includes user assessment information for at least one footwear fit parameter.

28. The system according to claim 25, wherein the foot size information is in millimeters.

29. The system according to claim 28, wherein when the selected footwear model is one of a men's and a youth's footwear model, the footwear sizing processor converts the received foot size information to the Brannock footwear size length as:

$$\text{Brannock footwear size length}=(\text{received foot size information }(mm)\times 0.118)-22.2, \text{ and}$$

wherein when the selected footwear model is a women's footwear model, the footwear sizing processor converts the received foot size information to the Brannock footwear size length as:

$$\text{Brannock footwear size length}=(\text{received foot size information }(mm)\times 0.118)-21.2.$$

30. The system according to claim 29, wherein when the recommended footwear size for the selected footwear model includes a decimal value that is greater than or equal to 0.0 and less than or equal to 0.2, the footwear sizing processor rounds the recommended footwear size down to the integer value of the recommended footwear size, wherein when the recommended footwear size for the selected footwear model includes a decimal value that is greater than 0.2 and less than or equal to 0.7, the footwear sizing processor rounds the recommended footwear size to the integer value of the recommended footwear size plus 0.5, and wherein when the recommended footwear size for the selected footwear model includes a value that is greater than 0.7 and less than 0.0, the footwear sizing processor rounds the recommended footwear size is rounded up to the next integer value.

31. The system according to claim 26, wherein the host computer sends information relating to the recommended footwear size for the selected footwear model to the client computer over the computer network.

32. The system according to claim 31, wherein the host computer receives information relating to a selected footwear size for the selected footwear model from the client computer.

33. The system according to claim 20, wherein the footwear sizing processor determines a recommended footwear size for the selected footwear model further based on a width adjustment factor for the selected footwear model.

34. The system according to claim 33, wherein the footwear sizing processor determines the width adjustment factor by selecting, for at least one selected footwear size length, a representative footwear from a selected footwear production run for the selected footwear model, each representative footwear having a different selected footwear size length, measuring an internal dimension for each representative footwear, determining a Brannock adjusted size width for each respective selected footwear size for a test subject group as the predetermined footwear size width minus the average Brannock footwear size width for the selected footwear size length for the test subject group when the measured internal dimension for each respective representative footwear is within about ±2 mm of an average internal dimension for the selected footwear size length of the representative footwear for the selected footwear production run of the selected footwear model, and determining the width adjustment factor for the selected production run for the selected footwear model based on each determined Brannock adjusted size width.

35. The system according to claim 34, wherein the footwear sizing processor further determines the width adjustment factor for the selected production run for the selected footwear by determining a human assessment for a ball girth fit parameter for each respective representative footwear when the measured internal dimension of the representative footwear is within about ±2 mm of an average internal dimension for the selected footwear size length of the representative footwear size for the selected footwear production run of the selected footwear model, determining the width adjustment factor for a selected footwear size as the Brannock adjusted size when the human assessment for the length fit parameter for the representative footwear width for the selected footwear size is assessed as being acceptable, determining the width adjustment factor for a selected footwear size length as the Brannock adjusted size width plus a fourth predetermined amount when the human assessment for the ball girth fit parameter for the representative footwear for the selected footwear size length is assessed as being too narrow, and determining the width adjustment factor for a selected footwear size length as the Brannock adjusted size width minus a fifth predetermined amount when the human assessment for the ball girth fit parameter for the representative footwear for the selected footwear size length is assessed as being too wide.

36. The system according to claim 35, wherein the footwear sizing processor further determines the width adjustment factor when the human assessment for the ball girth fit parameter for the representative footwear is assessed as being acceptable by determining a human assessment for a toe box width fit parameter for each respective representative footwear, determining the width adjustment factor for a selected footwear size length as the Brannock adjusted size width when the human assessment for the toe box width fit parameter for the representative footwear for the selected footwear size length is assessed as being acceptable, and determining the width adjustment factor for a selected footwear size as the Brannock adjusted size plus a sixth predetermined amount when the toe box width fit parameter for the selected footwear size length is assessed as being narrow.

37. The system according to claim 20, wherein the computer network is the Internet.

* * * * *